United States Patent
Wang

(10) Patent No.: US 9,766,960 B2
(45) Date of Patent: Sep. 19, 2017

(54) WORKLOAD-DRIVEN TECHNIQUES FOR PROVIDING BIASED SERVICE LEVEL GUARANTEES

(71) Applicant: salesforce.com, inc., San Francisco, CA (US)

(72) Inventor: Xiaodan Wang, Dublin, CA (US)

(73) Assignee: salesforce.com, inc., San Francisco, CA (US)

( * ) Notice: Subject to any disclaimer, the term of this patent is extended or adjusted under 35 U.S.C. 154(b) by 125 days.

(21) Appl. No.: 14/610,042

(22) Filed: Jan. 30, 2015

(65) Prior Publication Data
US 2016/0224380 A1   Aug. 4, 2016

(51) Int. Cl.
*G06F 9/46* (2006.01)
*G06F 9/54* (2006.01)

(52) U.S. Cl.
CPC ........ *G06F 9/546* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 5,161,223 A * | 11/1992 | Abraham | .......... G06F 17/30477 707/718 |
| 5,577,188 A | 11/1996 | Zhu | |
| 5,608,872 A | 3/1997 | Schwartz et al. | |
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |

(Continued)

OTHER PUBLICATIONS

Saleh et al., "Comparing FCFS & EDF Scheduling Algorithms for Read-Tim Packet Switching Networks", 2010 International Conference on Networking, Sensing and Control, pp. 698-703.*

(Continued)

*Primary Examiner* — H S Sough
*Assistant Examiner* — Timothy Duncan
(74) *Attorney, Agent, or Firm* — Alpine Technology Law Group LLC

(57) ABSTRACT

Techniques and architectures for workload management. A stream of messages is received with servers coupled to provide access to shared system resources. The servers are organized as at least two groups with a first group providing message queuing services and a second group providing message queuing services under first conditions and modified message queuing services under second conditions. Message queuing services are provided with the first group by treating all jobs as equal, processing jobs asynchronously and processing jobs in the background to defer to foreground, non-message queuing services, jobs. Message queuing services are provided with the second group by treating all jobs as equal, processing jobs asynchronously and processing jobs in the background to defer to foreground, non-message queuing services, jobs under the first conditions. Modified message queuing services are provided with the second group by shortest-slack-first scheduling under the second conditions.

53 Claims, 8 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,041,354 A * | 3/2000 | Biliris | G06F 9/4887 348/E7.073 |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,272,544 B1 * | 8/2001 | Mullen | G06F 9/505 709/223 |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 2001/0044791 A1 | 11/2001 | Richter et al. | |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0041566 A1 * | 4/2002 | Yang | H04L 1/0002 370/229 |
| 2002/0042264 A1 | 4/2002 | Kim | |
| 2002/0042843 A1 | 4/2002 | Diec | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0010489 A1 | 1/2004 | Rio | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2009/0077559 A1 * | 3/2009 | Tajima | G06F 9/4881 718/102 |
| 2009/0177744 A1 | 7/2009 | Marlow et al. | |
| 2009/0253405 A1 * | 10/2009 | Yang | H04M 15/00 455/406 |
| 2011/0258628 A1 * | 10/2011 | Devadhar | G06F 9/546 718/100 |
| 2011/0276579 A1 * | 11/2011 | Colrain | G06F 17/30557 707/756 |
| 2012/0066020 A1 * | 3/2012 | Moon | G06Q 10/10 705/7.28 |
| 2012/0317578 A1 * | 12/2012 | Kansal | G06F 9/5077 718/104 |
| 2013/0018890 A1 * | 1/2013 | Rajan | G06F 17/30336 707/741 |
| 2016/0170801 A1 * | 6/2016 | Di Balsamo | G06F 9/4887 718/104 |

OTHER PUBLICATIONS

Babcock et al., "Load Shedding for Aggregation Queries over Data Streams", Proceedings of the 20th International Conference on Data Engineering (ICDE'04), 2004 IEEE pp. 1-12.*

Bogard, "Queues are still queues", https://lostechies.com/jimmybogard/2010/11/18/queues-are-still-queues, accessed on Oct. 16, 2017.*

* cited by examiner

WORKLOAD-DRIVEN TECHNIQUES FOR PROVIDING BIASED SERVICE LEVEL GUARANTEES

TECHNICAL FIELD

Embodiments relate to techniques for managing workload in a computing environment. More particularly, embodiments relate to techniques for efficiently managing service levels in a computing environment.

BACKGROUND

In order to manage large amounts of data, organizations utilize various computing resources. These computing resources provide features for managing data, for example, dashboards, search results, data consolidation, etc. These features compete for scarce computing resources in order to provide the desired services. Techniques are required to manage the computing resources utilized to support these features.

BRIEF DESCRIPTION OF THE DRAWINGS

Embodiments of the invention are illustrated by way of example, and not by way of limitation, in the figures of the accompanying drawings in which like reference numerals refer to similar elements.

DETAILED DESCRIPTION

Figure 1:
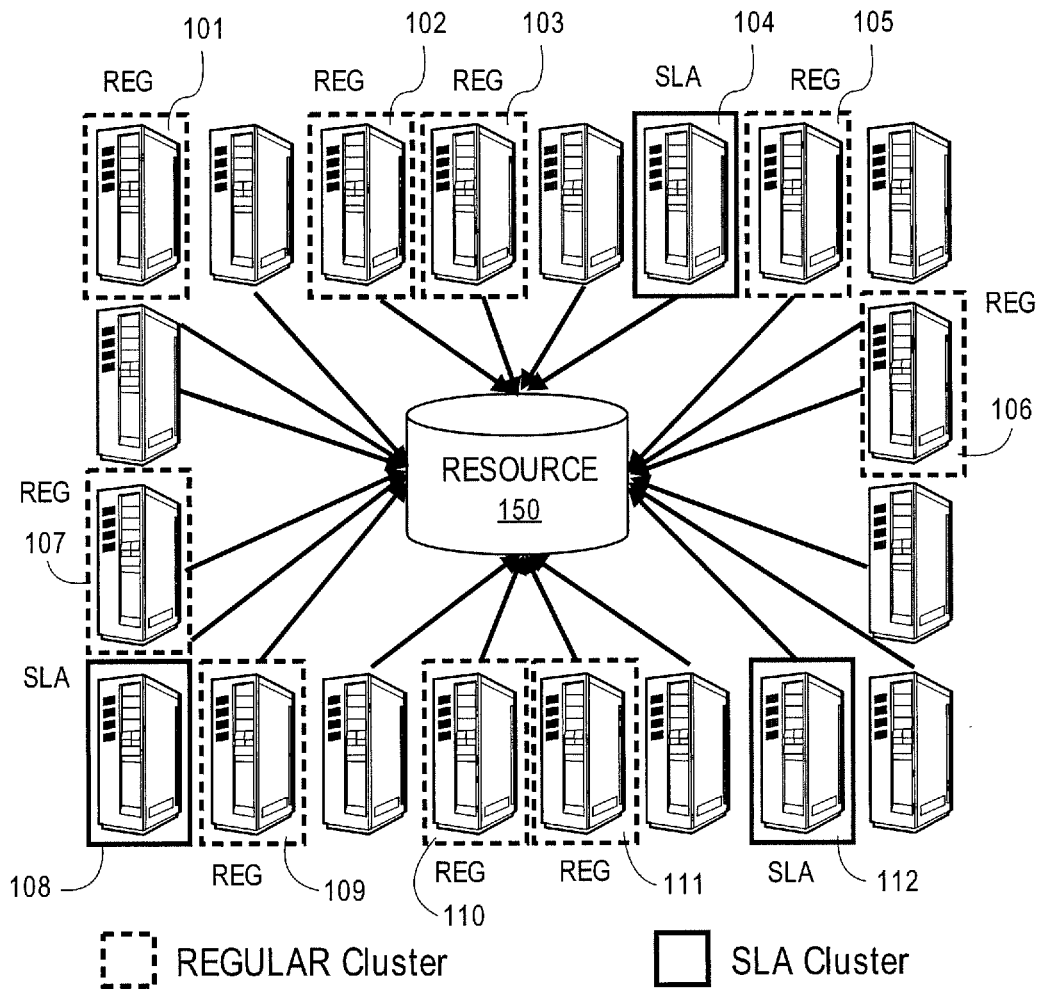
FIG. 1 is an architectural diagram of a server environment that can support biased service level agreement guarantees.

In the following description, numerous specific details are set forth. However, embodiments of the invention may be practiced without these specific details. In other instances, well-known circuits, structures and techniques have not been shown in detail in order not to obscure the understanding of this description.

One approach for managing job requests can be to provide an asynchronous job scheduling and processing system that can support the provided features. These features can include both user-facing features (e.g., dashboard reports) and internal features (e.g., cleaning up inactive database rows). One implementation can be based on the following assumptions: 1) all jobs are created equal; 2) jobs are asynchronous and can tolerate delays (e.g., tens of minutes); 3) jobs are background, or second-class, jobs that defer to foreground, or first-class, jobs (e.g., web request services). These assumptions can simplify job scheduling to some variant of round robin selection.

At some point, the approach set out above is no longer sufficient to provide satisfactory results. For example, the approach above can function sufficiently well during many hours of the day, but during peak hours when capacity limits are reached, background job servicing may be throttled, or shut down, to service foreground job servicing. This may result in unsatisfactory results for the background jobs.

In some situations, under certain conditions, customer expectations may violate all three of the assumptions above. For example, certain highly visible customer jobs may be more important than other traffic, and these jobs may be a much lower tolerance to delays, and possibly these jobs should not defer to foreground traffic. Described herein are techniques to manage this mismatch by utilizing service level guarantees. Described herein are techniques for providing service level guarantees by, for example, incorporating techniques that include one or more of 1) segmented clustering, 2) shortest-slack-first scheduling, 3) selective load shedding, and/or 4) dynamic message reordering. These techniques also allow for predictive alerting to provide notifications of impending delays before they occur.

In one embodiment, jobs are classified by a delay threshold (DT), which is a tolerance to job processing delays. In one embodiment, delay classifications correspond to different message types or features that utilize the asynchronous job scheduling system. For example, a dashboard job type can attach stricter delay bounds (e.g., tens of seconds) than a physical delete cleanup job type (e.g., days or weeks). In various embodiments, different delay thresholds can be attached to the same job types for different tenants of a multitenant environment. Thus, delay thresholds can be set on a per-type basis and/or a per-tenant basis.

In one embodiment, there is attached to each message an enqueue time (ENQ), or time at which the message was originally enqueued. In one embodiment, messages are enqueued in first-in-first-out (FIFO) ordering and each message type is assigned a separate physical queue, and the earliest enqueue time (EENQ) can be determined for a set of messages belonging to a selected message type by examining the first message in the queue.

The current time (CUR) is the current time and slack (SLK) is a deadline for completion of the corresponding message (e.g., when the delay threshold expires). Slack represents the elasticity or headroom with respect to scheduling at any point in time. Thus, a message type with low slack should be prioritized to avoid violating the delay threshold and a message type with large slack can be deferred without violating the delay thresholds. Slack for a selected message can be computed as:

$$SLK = ENQ + DT - CUR$$

In one embodiment, each message type is assigned to a separate queue and queues are FIFO ordered, so the properties of a set of messages that belong to a specific message type (i) can be described utilizing the tuple $<i, DT_i, EENQ_i>$ in which $DT_i$ and $EENQ_i$ are the delay threshold and the earliest enqueue time of message type i. Thus, the slack for message type i can be defined as:

$$SLK_i = EENQ_i + DT_i - CUR$$

In one embodiment, dynamic features of the workload that are captured are: 1) the number of messages for a specific type in a queue; 2) the average per message run time (e.g., wall clock time spent in the handler); and 3) the arrival rate of new messages of a specific type. In one embodiment, this information allows prediction of 1) whether there exists sufficient messaging queue capacity to meet service level guarantees; and 2) to proactively alert in response to spikes in traffic patterns.

Using the mechanisms and concepts described above, service level guarantees can be utilized to provide a more effective and efficient job handling mechanism. The framework described above can be used to explore multiple objectives such as, for example, maximizing the number of messages that meet their deadline (e.g., reduce the number of times the threshold delay is violated, or minimizing the maximum delay across all messages (e.g., ensure that no single message is excessively starved). In one embodiment, not all message types are treated equally. Thus, in one embodiment, biased service level guarantees (B-SLA) can be provided for scheduling.

In one embodiment, the following equation describes B-SLA functionality:

$$\min(DT_i) \text{ for } i \text{ in } V$$

Where V is the set of message types in which the delay threshold is violated. In other words, of the message types in which the delay threshold is violated, the system attempts to ensure that the message type with the lowest delay threshold is maximal. That is, the system will attempt to pack as many message types as possible with the lowest delay threshold at the expense of message types with higher thresholds (e.g., if the system can only meet service guarantees for three of five message types, then the three types with the lowest delay threshold are selected). Also, this definition allows for selectively dropping message types when service level guarantees can no longer be met.

Various embodiments for both hardware and software (and combinations thereof) based solutions to achieving the service level objectives are described herein. These B-SLA solutions can be workload-driven by incorporating relevant features of the workload (e.g., delay threshold, average runtime) and is biased by favoring feature types with lower delay thresholds and deferring remaining messages. In one embodiment, a plurality of servers can be organized as at least two groups with a first group providing message queuing services and a second group providing message queuing services under first conditions and modified message queuing services under second conditions. In one embodiment, the first conditions comprise meeting service level agreements and the second conditions comprise not meeting service level agreements In one embodiment, the B-SLA strategy utilizes a holistic approach to address the goal of ensuring that the message type with the lowest delay threshold violated is maximal. In one embodiment, the system allocates dedicated hardware via a segmented messaging cluster to provide predictable capacity and then utilizes a greedy shortest-slack-first (SSF) scheduling strategy to arrange and prioritize incoming message types that require service level guarantees. In one embodiment, not all message types have associated service level guarantees.

In one embodiment, the system can then selectively shed loads from lower priority traffic to free additional capacity when resources are constrained. In one embodiment, dynamic message reordering can be used to exploit elasticity in the workload such that variance in the delay is minimized.

In one embodiment, the base (or regular) message handling architecture is as described above that is based on the following assumptions: 1) all jobs are created equal; 2) jobs are asynchronous and can tolerate delays (e.g., tens of minutes); 3) jobs are background, or second-class, jobs that defer to foreground, or first-class, jobs (e.g., web request services). A group of one or more servers can be utilized to provide message handling duties under regular conditions.

In one embodiment, under some conditions, a segmented cluster architecture can be utilized to challenge the assumption that message queue traffic is second class behind foreground traffic. In one embodiment, message queue traffic can be provided by a default cluster with a dynamic set of application servers that dequeue and process messages. The application servers attempt to join the default cluster until the desired cluster size (e.g., 12-24 servers) is reached.

In one embodiment, depending on system load and delays experienced by existing traffic, the cluster size can grow or shrink as needed. In one embodiment, application servers in the cluster can monitor for resource conditions and defer to foreground traffic.

As described herein, a segmented cluster model can provide predictability that can ensure that messages are completed in a timely manner. In one embodiment, the system can provide a segmented, or partitioned, cluster with two segments, or classes: 1) Regular; and 2) SLA. In one embodiment, Regular application message servers behave as second-class servers. In one embodiment, resource monitoring is performed on these servers such that high system utilization or high processor load can cause these servers to stop processing messages (e.g., exit the cluster) and defer to foreground traffic.

In one embodiment, SLA message servers behave as first-class servers by disabling resource monitoring. That is, short of a forced restart, SLA message servers continue to process message traffic. Various splits (e.g., 25/75, 20/80, 33/67, 50/50) can be provided between Regular and SLA message servers. A 25/75 split, for example, means that a cluster size of 12 contains nine Regular message servers and three SLA servers; however, any cluster size and any split configuration can be supported.

In one embodiment, each server in the cluster is assigned a slot number. The application servers can identify as Regular or SLA based on slot number. For example, in a 25/75 split servers with slot numbers divisible by 4 can be SLA servers. Other assignment and ordering configurations can also be utilized.

FIG. 1 is an architectural diagram of a server environment that can support biased service level agreement guarantees. Any number of servers can be included in the computing environment with a subset of the servers (both Regular and SLA) designated for message queue handling functionality. Any of the servers in the computing environment can interact with the resources (e.g., a database) of the computing environment.

In one embodiment, under normal conditions, both Regular and SLA application servers process message queue traffic for all relevant feature types. In one embodiment, the SLA message servers (e.g., 104, 108, 112) operate differently than the Regular message servers (e.g., 101, 102, 103, 105, 106, 107, 109, 110, 111). In one embodiment, the SLA servers provide selective load shedding depending on whether service level guarantees can be met or not. This functionality is described in greater detail below.

In one embodiment, the split between the Regular message servers and the SLA message servers provides a way for the system to adjust, or modify, the level of guarantees provided. In one embodiment, if the delay threshold for critical message types are consistently violated, the split can be biased more toward the SLA message servers. For example, going from a 25/75 split to a 50/50 split would allocate more servers to the SLA functionality.

In one embodiment, message types are schedule on the SLA message servers in a shortest-slack-first (SSF) manner. In one embodiment, the SLA message servers queries each message type for the earliest enqueue time and derives the following tuple for each message type, i:

$<i,DT_i,EENQ_i>$

The slack ($SLK_i$) can then be computed based on the current time for each message type as discussed above. In one embodiment, message types are then scheduled greedily based on increasing slack order. Thus, if slack for message type i is lower than slack for message type j, ($SLK_i<SLK_j$) then all messages for type i with enqueue time ($ENQ_i$) before the current time (CUR) are scheduled before messages from type j.

Scheduling messages in increasing slack order allows for prioritization of messages at the highest risk of violating the corresponding delay threshold by allocating all available thread capacity on SLA message servers. During this time, Regular message servers continue to dequeue and process messages from all types in a fair manner to avoid starvation.

In one embodiment, in order to implement the SSF strategy, SLA message servers selectively subscribe to queues from messaging brokers so that only messages from the type with the lowest slack are dequeued. Once the queue is exhausted (e.g., no remaining messages with $ENQ_i>CUR$), SLA message servers subscribe to the message type queue with the next lowest slack. This is in contrast to Regular message servers that subscribe to all queues and messages are delivered in a round robin-like manner across all message types. Thus, SSF challenges the underlying assumption that all messages can tolerate relatively large delays. Ordering message types by slack means that scheduling is biased in favor of types with lower tolerance to delay.

Figure 2:
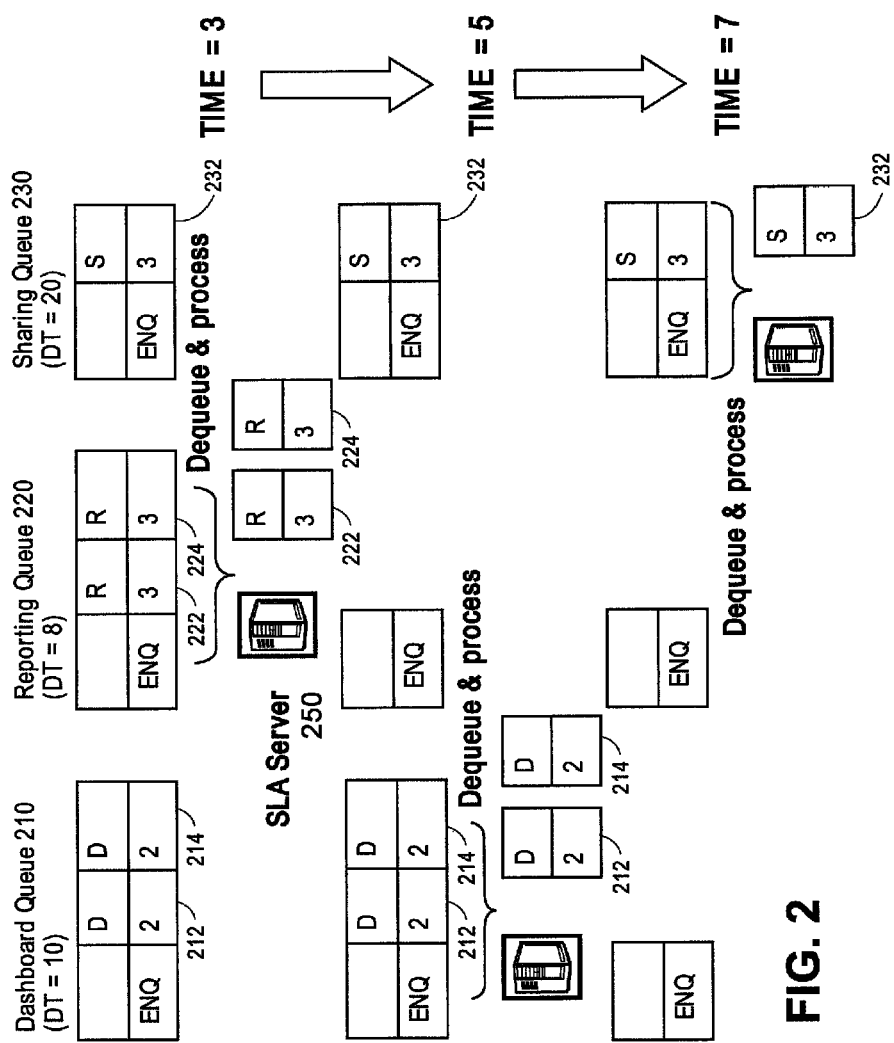
FIG. 2 is a conceptual diagram of a sample scenario with shortest-slack-first scheduling.

FIG. 2 is a conceptual diagram of a sample scenario with shortest-slack-first scheduling. The example of FIG. 2 includes three message types, however, any number and/or kind of message types can be supported. The example message types of FIG. 2 include Dashboard messages having an associated DT of 10, Reporting messages having an associated DT of 8, and Sharing messages having an associated DT of 20.

In the example of FIG. 2, Dashboard queue 210 includes two messages (212, 214) with ENQ times of 2, Reporting queue 220 includes two messages (222, 224) with ENQ times of 3, and Sharing queue 230 includes one message (232) with ENQ time of 3. Because Reporting queue 220 has the shortest delay threshold (DT=8), SLA message server 250 dequeues and processes messages 222 and 224 from Reporting queue 220. Next, SLA message server 250 dequeues and processes messages 212 and 214 from Dashboard queue 210. Finally, SLA message server 250 dequeues and processes message 232 from Sharing queue 230.

In one embodiment, selective load shedding is utilized to cherry pick messages that yield the biggest gain when resources are scarce. One assumption of Regular message handling is that all messages are equal. However, B-SLA (via the SLA message servers) utilizes the delay threshold ($DT_i$) to explicitly rank the importance of message types such that a message type, i, is considered more important than message type j if $DT_i>DT_j$. This provides the basis in which selective load shedding can ignore messages on SLA message servers.

In one embodiment, selective load shedding is an iterative approach for finding the subset of message types to process on SLA message servers such that the message type with the lowest delay threshold violated is maximal. In other words, as many messages as possible with the delay sensitive messages are processed while ensuring service level guarantees are met. The following pseudocode describes one embodiment of a technique for selective load shedding:

| selectivelyShedLoad(messageType) |
|---|
| 1. messageTypesSortedByDT = orderByDT(messageTypes)<br>2. while (!canMeetSLA(messageTypeSortedByDT))<br>3.    largestDT =<br>      getMessageTypeWithLargestDT(MessageTypesSortedByDT)<br>4.    messageTypesSortedByDT = messageTypesSortedByDT −<br>      largestDT<br>5. return messageTypesSortedByDT |

Analyzing the pseudocode above, Line 1 sorts all message types by the delay threshold, DT. Lines 2-4 iterate until a subset of message types are found in which SLA message servers can meet service level guarantees. Line 5 returns a subset of message types that are scheduled via the SSF strategy. In one embodiment, load shedding does not need to start with all message types. In environments in which workload access patterns are unlikely to change abruptly, the list of message types can be seeded by the list of types chosen in the prior iteration. From there, the list can be expanded to incorporate more types on SLA message servers or the list can be shrunk if service level guarantees cannot be met.

In one embodiment, selective load shedding has two components: 1) workload profiling; and 2) workload prediction. Workload profiling tracks the average running time of messages for each specific type. In one embodiment, a daily running average can be determined via metering. The average running time allows predicting, with reasonable accuracy, the amount of thread capacity required to process all messages of a given type. Other techniques can also be used.

In one embodiment, workload prediction determines whether service level guarantees can be met for a specific set of message types. In one embodiment, the number of pending messages, the average running time by message type, the arrival rate of incoming messages are utilized by a stochastic process to determine whether service level guarantees can be met. Pseudocode for one embodiment of a SSF-based workload prediction follows:

| canMeetSLA(messageTypes) |
|---|
| 1. messageTypesSortedBySlack = orderBySlack(messageTypes)<br>2. CUR = currentTime<br>3. while(messageTypesSortedBySlack is not empty)<br>4.    messageType_i =<br>      getSmallestSlack(messageTypesSortedBySlack)<br>5.    messageTypesSortedBySlack = messageTypesSortedBySlack −<br>      messageType_i<br>6.    SLK_i = messageType_i.EENQ + messageType_i.DT − CUR<br>7.    averageRuntime_i = messageType_i.runtime<br>8.    numPendingMessages_i =<br>      messageType_i.numPendingMessages<br>9.    timeElapsed = (numPendingMessages_i * averageRuntime_i /<br>sumSLAServers / numThreadsPerServer) * overheadBuffer<br>10.  if(timeElapsed > SLK_i) return false<br>11.  CUR = CUR + timeElapsed<br>12.  return true |

Line 1 sorts the message types by increasing slack order. Lines 3-11 iterate over each message type in order to determine whether service level guarantees can be met.

Specifically, line 4 grabs the message type with the smallest slack (i.e., most in danger of violating its delay threshold). Next, lines 6-8 compute the slack, average running time, and number of pending messages on the queue for this message type.

With this information, the system can determine the amount of message queue thread capacity required to process all messages for a message type (numPendingMessages_i*averageRuntime_i). The result is then adjusted by the available thread capacity in the message queue system in line 9 (numSLAServers denotes the number of SLA servers and numThreadsPerServer denotes the number of concurrent messages that can be processed per server). In one embodiment, the result can be multiplied by overheadBuffer to add a conservative buffer to account for time lost due to setup and teardown overhead, for example, dequeuing the message and checking out new database connections. Any buffer amount (e.g., 10%, 15%, 12.5%) can be used.

In one embodiment, the resultant time can be compared with slack ($SLK_i$) in line 10. If the result exceeds the slack, then the capacity is insufficient for meeting service level guarantees and the return is "false." Next, the clock time is incremented in line 11 and the pseudocode continues to the message type with the next lowest slack. If all message types are processed within the time allotted by the slack, then true is returned in line 12.

While the message queue mechanisms described above may not guarantee that message enqueue order is preserved, the system attempts to dequeue in the enqueue order as much as possible. Preserving order reduces variance on dequeue latency and processing messages out of order may disrupt end user experience (e.g., seeing the reply posted before the original post).

In one embodiment, the B-SLA mechanisms described herein employ dynamic message reordering to ensure that enqueue order is preserved in the presence of SSF scheduling. Specifically, dynamic message reordering first identifies elasticity in the slack value between competing message types on SLA message servers. The elasticity can be exploited by cycling and dequeuing from queues belonging to different message types without violating delay thresholds. In this way, it preserves enqueue order by dynamically cycling among message types rather than scheduling message types in strict SSF order.

In the SSF strategy discussed above, message types are scheduled in increasing order of slack ($SLK_i$ for message type i). However, slack values are based on the earliest enqueue time of each message type (EENQ). When multiple messages are pending for a given type, certain messages for type i may exhibit different enqueue times compared with the earliest enqueue time ($EENQ_i$). Consider the following three messages for type A in enqueue order:

| Message | Enqueue Time (ENQ) |
|---|---|
| A_1 | 1 |
| A_2 | 5 |
| A_3 | 5 |

Assume that the current time is 5 and each message of type A can be processed in 1 unit of time. Also, let the delay threshold for type A be 10 such that SLK_A is 6 (1+10−5). If A_1 is processed first, then at time 6, the slack for type A becomes 9 (5+10−6). This is defined as slack easing after partially processing messages of type A. In other words, after completing message A_1, additional elasticity is introduced in the slack for type A that allows for shuffling of another message type, for example, type B ahead of the remaining type A messages. Consider the following two messages pending for type B:

| Message | Enqueue Time (ENQ) |
|---|---|
| B_1 | 3 |
| B_2 | 3 |

Let the delay threshold for type B be 10 and the per message processing time be 1 such that SLK_B is 7 (3+10−6). At time 6, type B is shuffled ahead of type A (e.g., by unsubscribing from type A's queue and subscribing to and dequeuing from type B's queue) because SLK_B<SLK_A. By reordering messages based on slack, processing can more closely track enqueue order and reduce variance in the delay.

In the example above, strict SSF scheduling would result in the following processing order:

$$A\_1(4), A\_2(1), A\_3(2), B\_1(5), B\_2 \quad (6)$$

The number in parenthesis represents the per message delay based on respective enqueue times. In this example, variance with strict SSF scheduling is 3.44. With dynamic message reordering, messages are processed in the following order:

$$A\_1(4), B\_1(3), B\_2(4), A\_2(3), A\_3 \quad (4)$$

The variance is reduced to 0.24.

It may not be feasible to reorder messages after every dequeue because the overhead may be too high (e.g., setup and teardown overhead can become prohibitive). In one embodiment, message types may be reordered after a batch or messages that includes selected number (e.g., 25, 100, 450, 1000, 1250, 2000) of messages. In one embodiment, the number of messages in a batch is sufficiently large so as to amortize setup and teardown overhead over the batch. Pseudocode for one embodiment of dynamic message reordering is as follows:

DynamicMessageReordering(remainingMessageTypes, subscribedMessageType)

1. EENQ = getEENQForType(subscribedMessageType)
2. CUR = currentTime
3. SLK = EENQ + subscribedMessageType.DT − CUR
4. minSlackType = getMessageTypeWithMinimumSlack(remainingMessageTypes)
5. if(minSlackType.SLK < SLK)
6.   unsubscribeFromQueue(subscribedMessageType)
7.   subscribeToQueue(minSlackType)
8.   return minSlackType
9. return subscribedMessageType Lines 1-3 compute the updated slack for the message type currently selected for dequeue based on earliest enqueue time and current time. In one embodiment, the earliest enqueue time can be approximated based on the enqueue time of the last message dequeued. This optimization helps avoid network round-trip of querying the top message on the queue. Line 4 computes the minimum slack from the remaining message types. If the type with the minimum slack is lower than the updated slack for the currently dequeued message type, the two types in lines 5-8 are shuffled and the new message type is returned. Otherwise, the currently dequeued message type is returned in line 9.

Figure 3:
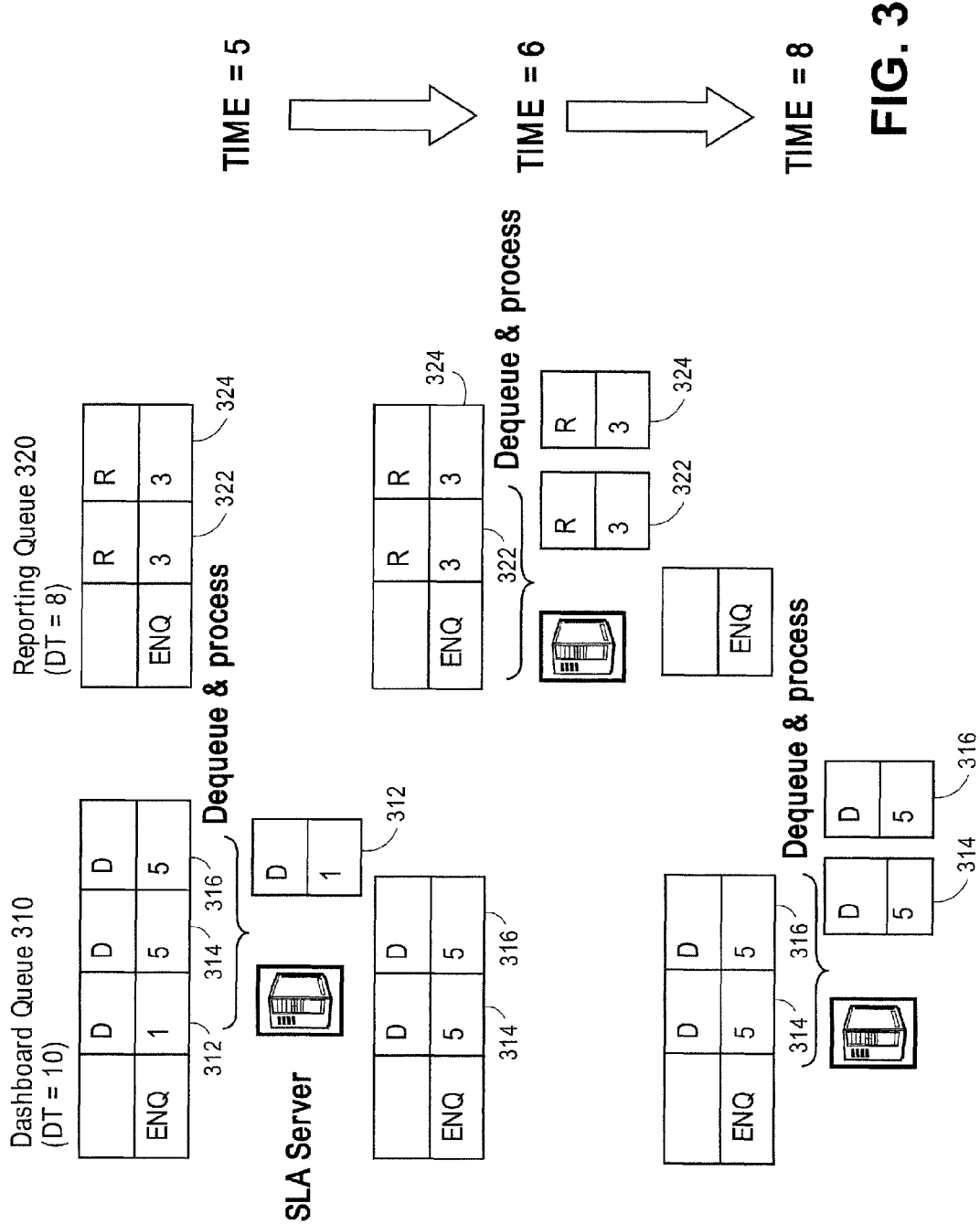
FIG. 3 a conceptual diagram of a sample scenario with dynamic message reordering.

FIG. 3 illustrates a conceptual diagram of a sample scenario with dynamic message reordering. The example of FIG. 3 includes two message types, however, any number and/or kind of message types can be supported. The example message types of FIG. 3 include Dashboard messages having an associated DT of 10 and Reporting messages having an associated DT of 8. The example of FIG. 3 utilizes a batch size of 1 for explanation purposes.

In the example of FIG. 3, Dashboard queue 310 includes three messages (312, 314, 316) with ENQ times of 1, 5 and 5, respectively and Reporting queue 320 includes two messages (322, 324) with ENQ times of 3. Message 312 is processed first leaving messages 314 and 316 in Dashboard queue 310 and messages 322 and 324 in Reporting queue 320.

Upon completion of processing for message 312, message type is switched to Reporting because the slack for Reporting messages (11=8+3) is less than the slack for Dashboard messages (15=10+5). Processing is switched to Reporting queue 320. Thus, messages 322 and 324 are processed. Processing is then switched back to Dashboard queue 310 to process messages 314 and 316.

One advantage of the techniques described herein is that impending message delays can be predicted before they occur. In one embodiment, any message type that is dropped from SLA servers via selective load shedding can trigger an alert. In one embodiment, the alert includes both the message type in danger of not meeting service level guarantees and the remaining time until delay impacts users (slack). Thus, the techniques described herein can provide early warning for system administrators to respond to capacity constraints.

Figure 4:
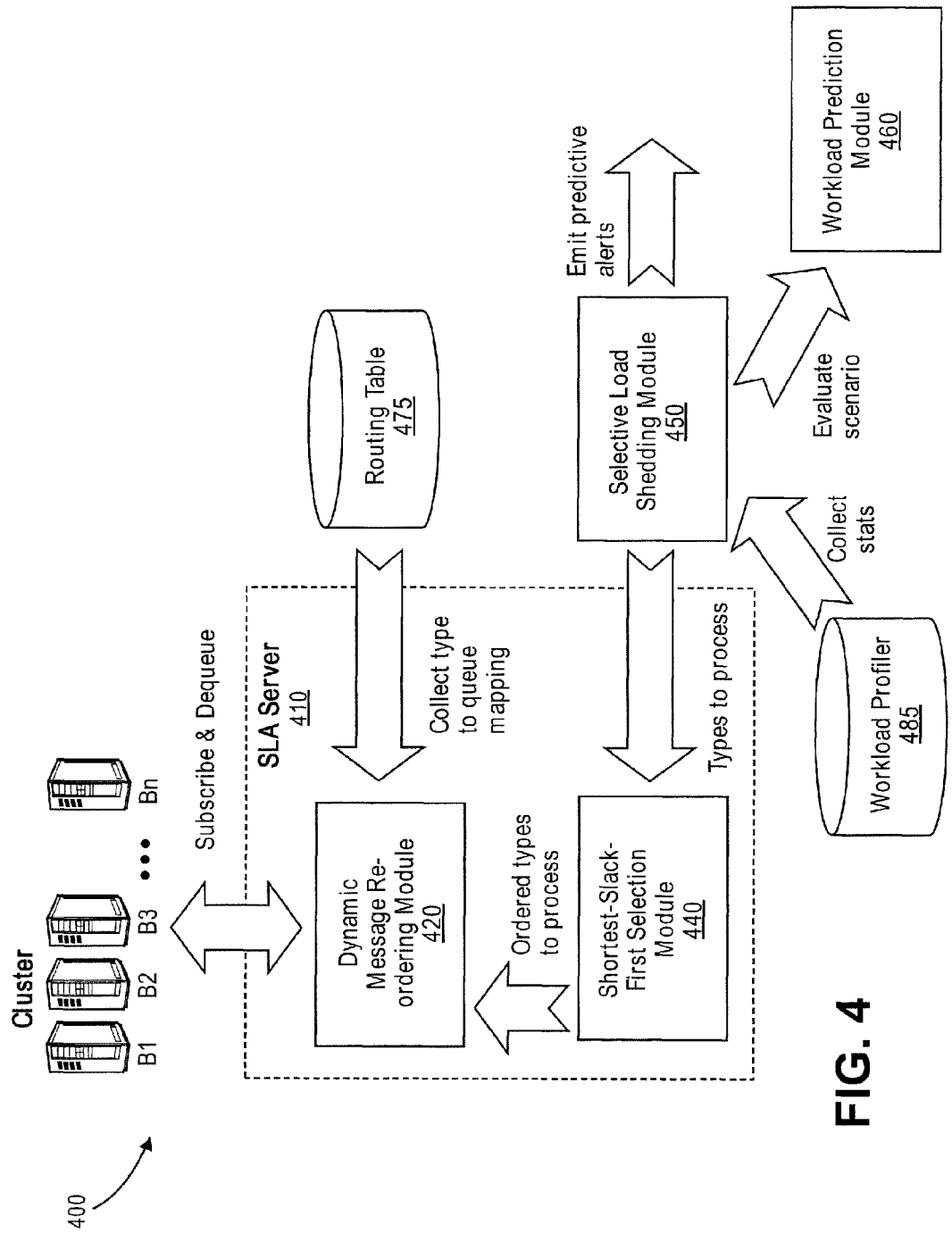
FIG. 4 is a conceptual diagram of one embodiment of a system that can provide message queuing services with at least one SLA server.

FIG. 4 is a conceptual diagram of one embodiment of a system that can provide message queuing services with at least one SLA server. SLA server 410 operates as part of cluster 400, which can be a cluster of any size (see one example above).

In one embodiment, SLA server 410 includes dynamic message reordering module 420 that can communicate with one or more other servers in cluster 400 to provide dynamic message reordering as described above. In one embodiment, dynamic message reordering module 420 can collect type-to-queue mapping information (and/or other information) from routing table 475. Routing table 475 can be maintained by SLA server 410 or by another component (e.g., server) of cluster 400.

In one embodiment, shortest-slack-first (SSF) selection module 440 can provide ordered types to dynamic message reordering module 420, which can be used to reorder messages of those types. In one embodiment, SSF selection module 440 operates according to SSF scheduling mechanisms as described above.

In one embodiment, selective load shedding module 450 operates as described above and provides SSF selection module 440 with message types to process. In one embodiment, selective load shedding module 450 can provide predictive alerts, for example, message to system administrators. In one embodiment, selective load shedding module 450 can collect statistical information from one or more sources including, for example, one or more work profilers/ profiler databases 485 to determine the message types to shed. In one embodiment, selective load shedding module 450 provides scenario evaluation information to workload prediction module 460, which can provide predictions related to message queuing workloads.

Figure 5:
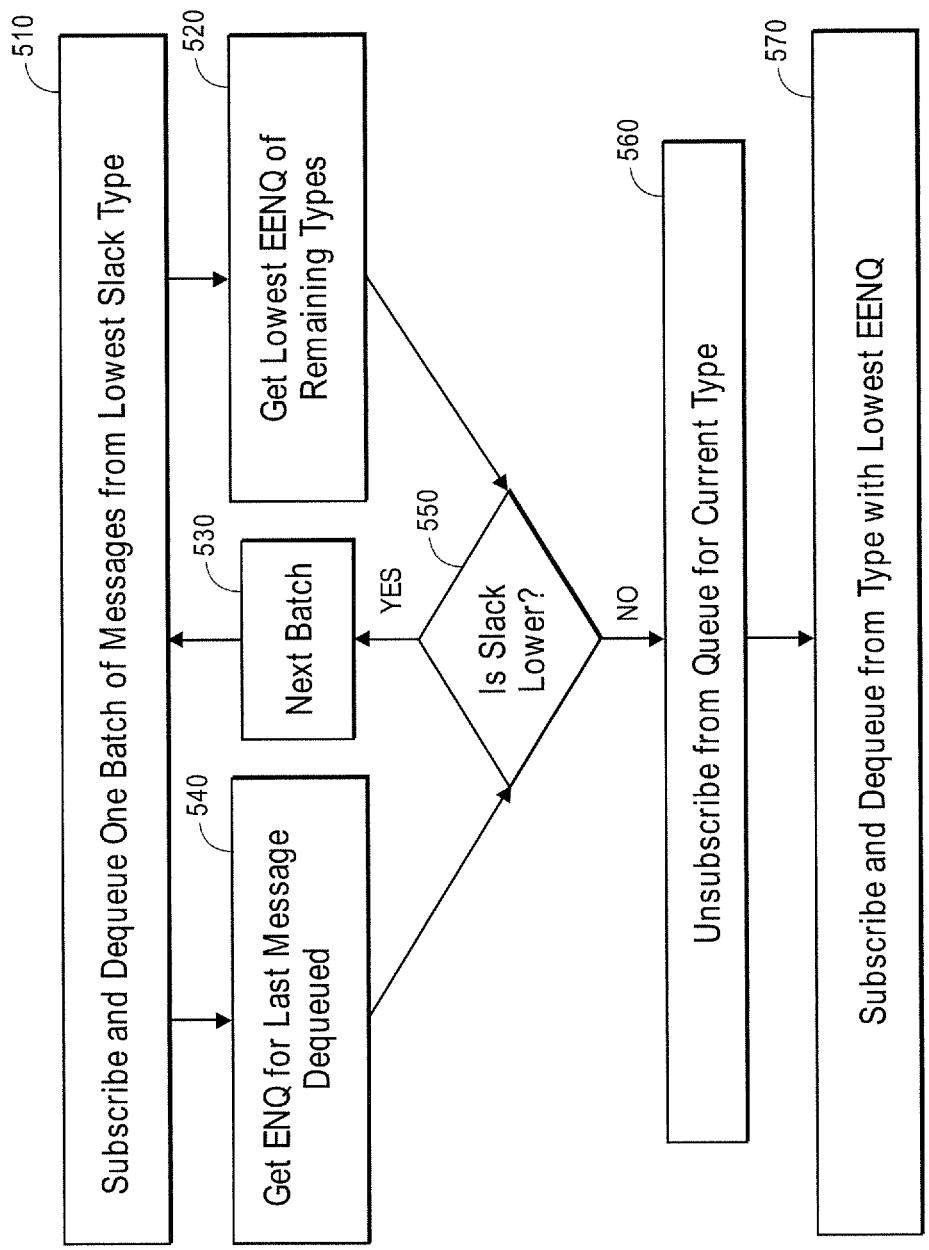
FIG. 5 is a flow diagram for one embodiment of dynamic message reordering.

FIG. 5 is a flow diagram for one embodiment of dynamic message reordering. In one embodiment, the operations of FIG. 5 are performed by a dynamic message reordering module (e.g., 420 of FIG. 4); however, the operations can also be performed by one or more modules.

In one embodiment, the dynamic message reordering module subscribes to a message queue and dequeues one batch of messages of the lowest slack type. Determination of the lowest slack type is described above. The batch of messages is processed. In one embodiment, as part of dequeuing the batch of messages, the ENQ value for the last message dequeues is obtained, 540. In one embodiment, as part of dequeuing the batch of messages, the lowest EENQ value of the remaining types is determined/received, 520.

If the slack of the current message type is lower than the slack of the remaining message types, 550, the next batch is processed, 530, by subscribing (if necessary) and dequeuing a batch of messages, 510. In one embodiment, if the slack for current message type is not lower than the slack of the remaining message types, 550, the dynamic message reordering module unsubscribes from the message queue of the current message type, 560. The dynamic message reordering module then subscribes to the message queue for the message type with the lowest slack and dequeues a batch of messages, 570.

Figure 6:
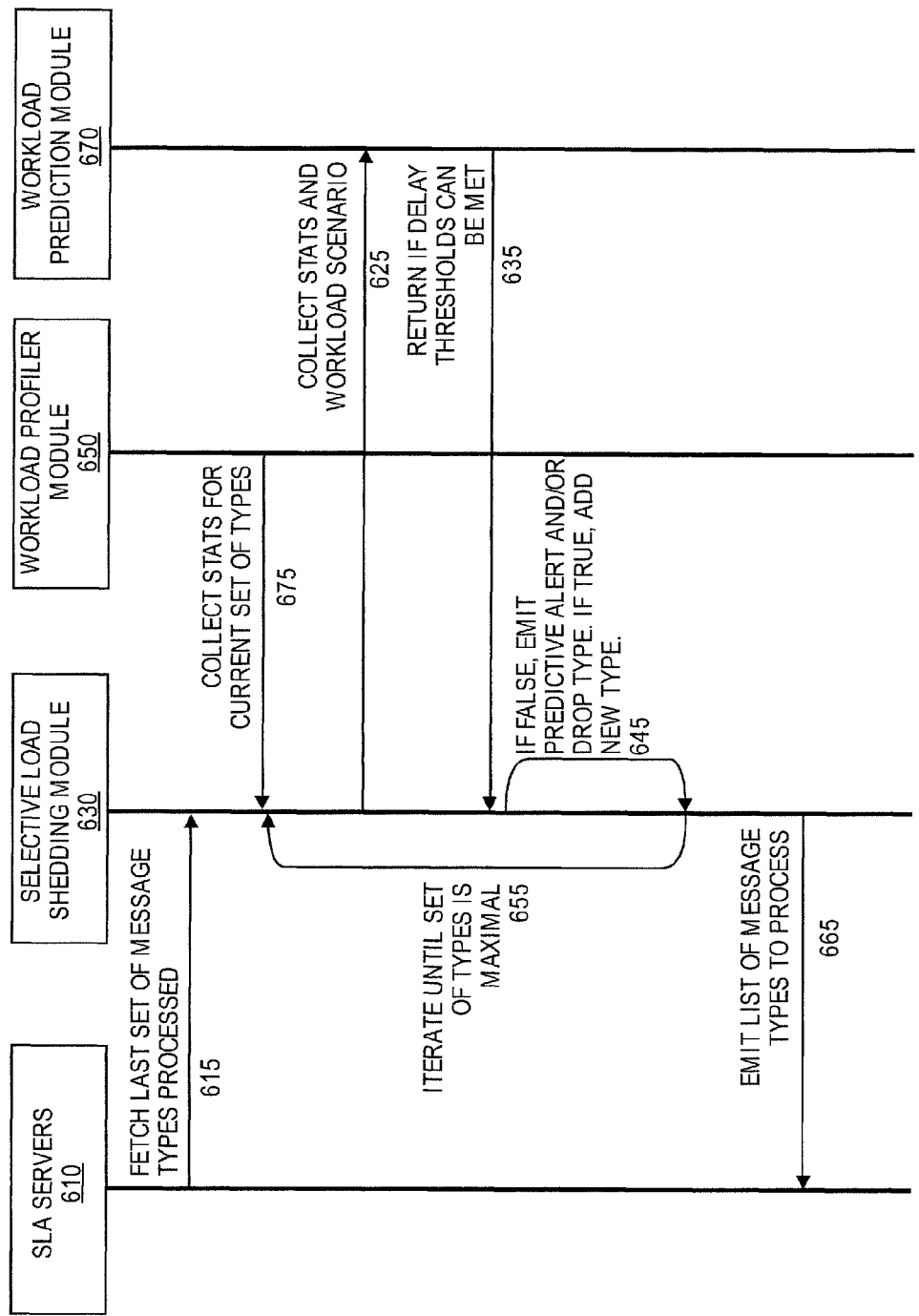
FIG. 6 is a timing diagram of one embodiment of selective load shedding.

FIG. 6 is a timing diagram of one embodiment of selective load shedding. In one embodiment, SLA server(s) 610 fetch the last set of message types to be processed, 615. Information from the last set of message types processed is provided to selective load shedding module 630. In one embodiment, some or all of this information can be provided to workload prediction module 670 to collect statistics and workload scenario information, 625. In one embodiment, workload prediction module 670 can indicate to selective load shedding module 630 whether processing thresholds (e.g., service level criteria) can be met, 635. In one embodiment, workload profiler module 650 collects and/or provides statistical information for the current set of types (675) to selective load shedding module 630.

In one embodiment, if the processing thresholds cannot be met, a predictive alert can be generated and/or the message type for which the thresholds cannot be met are dropped, 645, by selective load shedding module 630. In one embodiment, if the processing thresholds can be met the message type is added to the list of message types processed, 645, by selective load shedding module 630. In one embodiment, this process is repeated until the set of types to be processed is maximal, 655. In one embodiment, selective load shedding module 630 provides a list of message types (665) to process to SLA server(s) 610.

Figure 7:
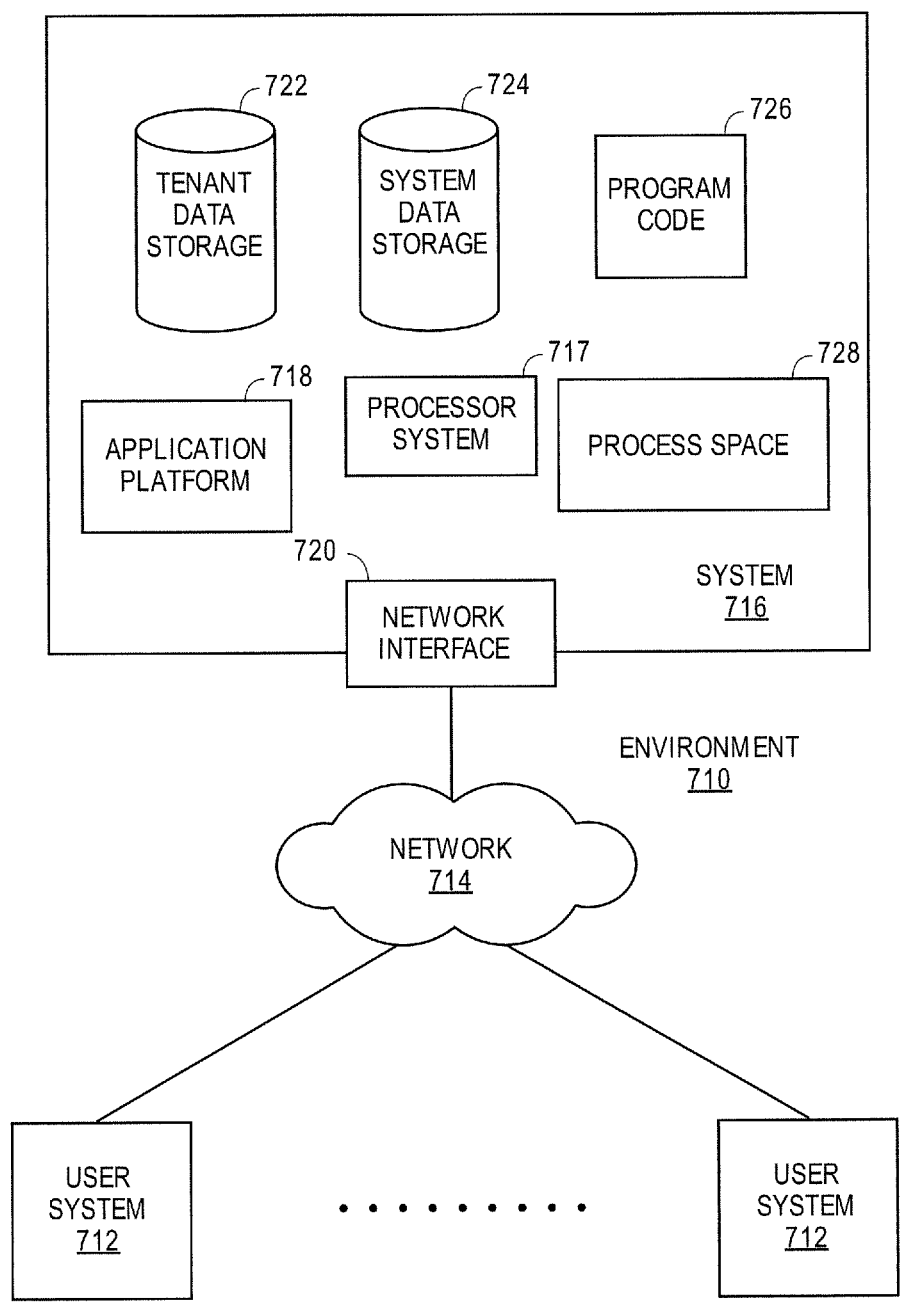
FIG. 7 illustrates a block diagram of an environment where an on-demand database service might be used.

FIG. 7 illustrates a block diagram of an environment 710 wherein an on-demand database service might be used. Environment 710 may include user systems 712, network 714, system 716, processor system 717, application platform 718, network interface 720, tenant data storage 722, system data storage 724, program code 726, and process space 728. In other embodiments, environment 710 may not have all of the components listed and/or may have other elements instead of, or in addition to, those listed above.

Environment 710 is an environment in which an on-demand database service exists. User system 712 may be any machine or system that is used by a user to access a database user system. For example, any of user systems 712 can be a handheld computing device, a mobile phone, a laptop computer, a work station, and/or a network of computing devices. As illustrated in herein FIG. 7 (and in more detail in FIG. 8) user systems 712 might interact via a network 714 with an on-demand database service, which is system 716.

An on-demand database service, such as system 716, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 716" and "system 716" will be used interchangeably herein. A database image may include one or more database objects. A relational database management system (RDMS) or the equivalent may execute storage and retrieval of information against the database object(s). Application platform 718 may be a framework that allows the applications of system 716 to run, such as the hardware and/or software, e.g., the operating system. In an embodiment, on-demand database service 716 may include an application platform 718 that enables creation, managing and executing one or more applications developed by the provider of the on-demand database service, users accessing the on-demand database service via user systems 712, or third party application developers accessing the on-demand database service via user systems 712.

The users of user systems 712 may differ in their respective capacities, and the capacity of a particular user system 712 might be entirely determined by permissions (permission levels) for the current user. For example, where a salesperson is using a particular user system 712 to interact with system 716, that user system has the capacities allotted to that salesperson. However, while an administrator is using that user system to interact with system 716, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 714 is any network or combination of networks of devices that communicate with one another. For example, network 714 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 712 might communicate with system 716 using TCP/IP and, at a higher network level, use other common Internet protocols to communicate, such as HTTP, FTP, AFS, WAP, etc. In an example where HTTP is used, user system 712 might include an HTTP client commonly referred to as a "browser" for sending and receiving HTTP messages to and from an HTTP server at system 716. Such an HTTP server might be implemented as the sole network interface between system 716 and network 714, but other techniques might be used as well or instead. In some implementations, the interface between system 716 and network 714 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 716, shown in FIG. 7, implements a web-based customer relationship management (CRM) system. For example, in one embodiment, system 716 includes application servers configured to implement and execute CRM software applications as well as provide related data, code, forms, webpages and other information to and from user systems 712 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 716 implements applications other than, or in addition to, a CRM application. For example, system 716 may provide tenant access to multiple hosted (standard and custom) applications, including a CRM application. User (or third party developer) applications, which may or may not include CRM, may be supported by the application platform 718, which manages creation, storage of the applications into one or more database objects and executing of the applications in a virtual machine in the process space of the system 716.

One arrangement for elements of system 716 is shown in FIG. 7, including a network interface 720, application platform 718, tenant data storage 722 for tenant data 723, system data storage 724 for system data 725 accessible to system 716 and possibly multiple tenants, program code 726 for implementing various functions of system 716, and a process space 728 for executing MTS system processes and tenant-specific processes, such as running applications as part of an application hosting service. Additional processes that may execute on system 716 include database indexing processes.

Several elements in the system shown in FIG. 7 include conventional, well-known elements that are explained only briefly here. For example, each user system 712 could include a desktop personal computer, workstation, laptop, PDA, cell phone, or any wireless access protocol (WAP) enabled device or any other computing device capable of interfacing directly or indirectly to the Internet or other network connection. User system 712 typically runs an HTTP client, e.g., a browsing program, such as MICROSOFT's INTERNET EXPLORER browser, NETSCAPE's NAVIGATOR browser, OPERA's browser, or a WAP-enabled browser in the case of a cell phone, PDA or other wireless device, or the like, allowing a user (e.g., subscriber of the multi-tenant database system) of user system 712 to access, process and view information, pages and applications available to it from system 716 over network 714. Each user system 712 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 716 or other systems or servers. For example, the user interface device can be used to access data and applications hosted by system 716, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 712 and all of its components are operator configurable using applications, such as a browser, including computer code run using a central processing unit such as an Intel Pentium® processor or the like. Similarly, system 716 (and additional instances of an MTS, where more than one is present) and all of their components might be operator configurable using application(s) including computer code to run using a central processing unit such as processor system 717, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 716 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 716 is configured to provide webpages, forms, applications, data and media content to user (client) systems 712 to support the access by user systems 712 as tenants of system 716. As such, system 716 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 8:
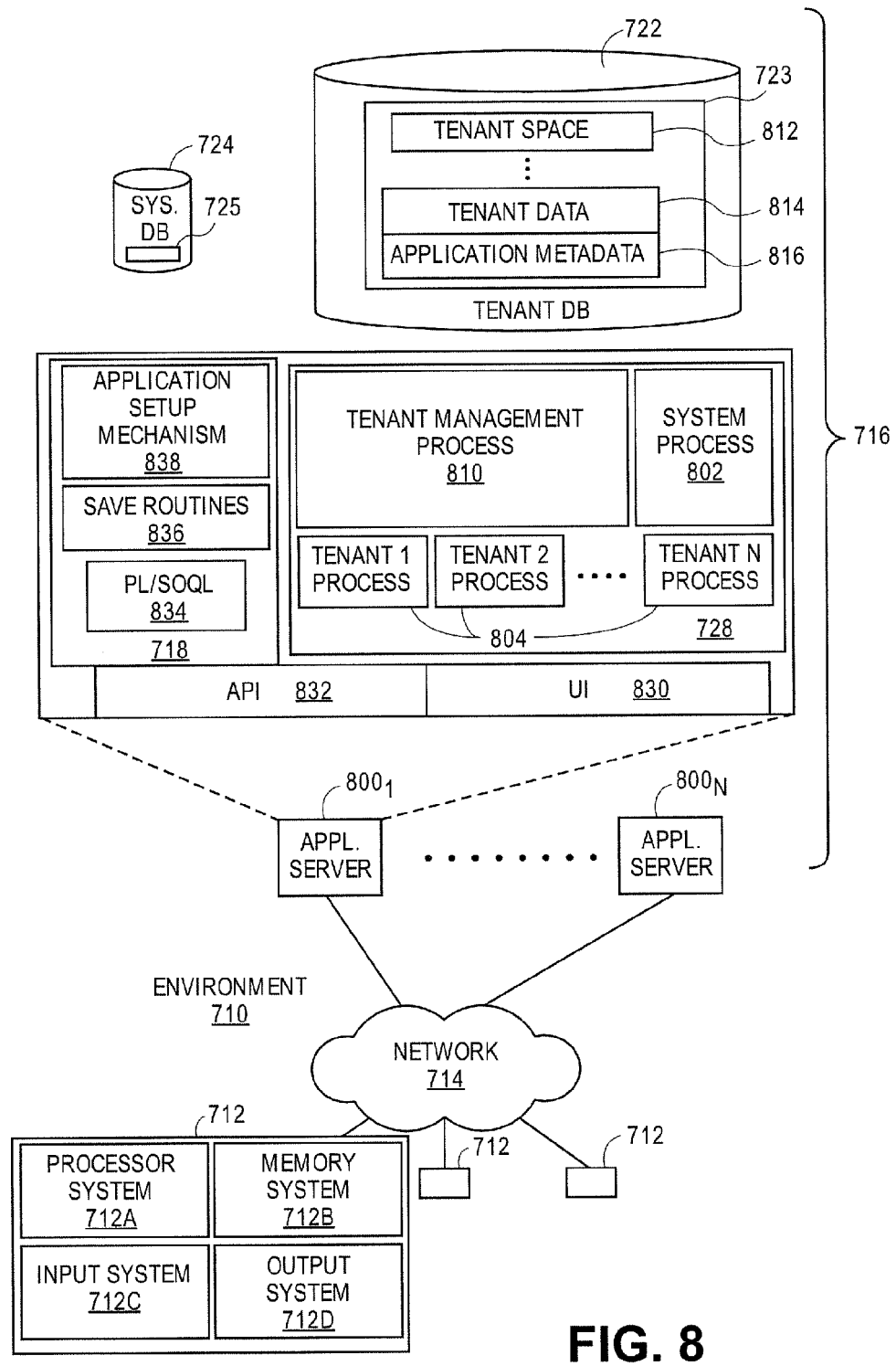
FIG. 8 illustrates a block diagram of an environment where an on-demand database service might be provided.

FIG. 8 also illustrates environment 710. However, in FIG. 8 elements of system 716 and various interconnections in an embodiment are further illustrated. FIG. 8 shows that user system 712 may include processor system 712A, memory system 712B, input system 712C, and output system 712D. FIG. 8 shows network 714 and system 716. FIG. 8 also shows that system 716 may include tenant data storage 722, tenant data 723, system data storage 724, system data 725, User Interface (UI) 830, Application Program Interface (API) 832, PL/SOQL 834, save routines 836, application setup mechanism 838, applications servers $800_1$-$800_N$, system process space 802, tenant process spaces 804, tenant management process space 810, tenant storage space 812, tenant data 814, and application metadata 816. In other embodiments, environment 710 may not have the same elements as those listed above and/or may have other elements instead of, or in addition to, those listed above.

User system 712, network 714, system 716, tenant data storage 722, and system data storage 724 were discussed above in FIG. 7. Regarding user system 712, processor system 712A may be any combination of one or more processors. Memory system 712B may be any combination of one or more memory devices, short term, and/or long term memory. Input system 712C may be any combination of input devices, such as one or more keyboards, mice, trackballs, scanners, cameras, and/or interfaces to networks. Output system 712D may be any combination of output devices, such as one or more monitors, printers, and/or interfaces to networks. As shown by FIG. 8, system 716 may include a network interface 720 (of FIG. 7) implemented as a set of HTTP application servers 800, an application platform 718, tenant data storage 722, and system data storage 724. Also shown is system process space 802, including individual tenant process spaces 804 and a tenant management process space 810. Each application server 800 may be configured to tenant data storage 722 and the tenant data 723 therein, and system data storage 724 and the system data 725 therein to serve requests of user systems 712. The tenant data 723 might be divided into individual tenant storage spaces 812, which can be either a physical arrangement and/or a logical arrangement of data. Within each tenant storage space 812, tenant data 814 and application metadata 816 might be similarly allocated for each user. For example, a copy of a user's most recently used (MRU) items might be stored to tenant data 814. Similarly, a copy of MRU items for an entire organization that is a tenant might be stored to tenant storage space 812. A UI 830 provides a user interface and an API 832 provides an application programmer interface to system 716 resident processes to users and/or developers at user systems 712. The tenant data and the system data may be stored in various databases, such as one or more Oracle™ databases.

Application platform 718 includes an application setup mechanism 838 that supports application developers' creation and management of applications, which may be saved as metadata into tenant data storage 722 by save routines 836 for execution by subscribers as one or more tenant process spaces 804 managed by tenant management process 810 for example. Invocations to such applications may be coded using PL/SOQL 834 that provides a programming language style interface extension to API 832. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 816 for the subscriber making the invocation and executing the metadata as an application in a virtual machine.

Each application server 800 may be communicably coupled to database systems, e.g., having access to system data 725 and tenant data 723, via a different network connection. For example, one application server $800_1$ might be coupled via the network 714 (e.g., the Internet), another application server $800_{N-1}$ might be coupled via a direct network link, and another application server $800_N$ might be coupled by yet a different network connection. Transfer Control Protocol and Internet Protocol (TCP/IP) are typical protocols for communicating between application servers 800 and the database system. However, it will be apparent to one skilled in the art that other transport protocols may be used to optimize the system depending on the network interconnect used.

In certain embodiments, each application server 800 is configured to handle requests for any user associated with any organization that is a tenant. Because it is desirable to be able to add and remove application servers from the server pool at any time for any reason, there is preferably no server affinity for a user and/or organization to a specific application server 800. In one embodiment, therefore, an interface system implementing a load balancing function (e.g., an F5 Big-IP load balancer) is communicably coupled between the application servers 800 and the user systems 712 to distribute requests to the application servers 800. In one embodiment, the load balancer uses a least connections algorithm to route user requests to the application servers 800. Other examples of load balancing algorithms, such as round robin and observed response time, also can be used. For example, in certain embodiments, three consecutive requests from the same user could hit three different application servers 800, and three requests from different users could hit the same application server 800. In this manner, system 716 is multi-tenant, wherein system 716 handles storage of, and access to, different objects, data and applications across disparate users and organizations.

As an example of storage, one tenant might be a company that employs a sales force where each salesperson uses system 716 to manage their sales process. Thus, a user might maintain contact data, leads data, customer follow-up data, performance data, goals and progress data, etc., all applicable to that user's personal sales process (e.g., in tenant data storage 722). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 716 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 716 might also maintain system level data usable by multiple tenants or other data. Such system level data might include industry reports, news, postings, and the like that are sharable among tenants.

In certain embodiments, user systems 712 (which may be client systems) communicate with application servers 800 to request and update system-level and tenant-level data from system 716 that may require sending one or more queries to tenant data storage 722 and/or system data storage 724. System 716 (e.g., an application server 800 in system 716) automatically generates one or more SQL statements (e.g., one or more SQL queries) that are designed to access the desired information. System data storage 724 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A system comprising:
   one or more shared system resources;
   a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise meeting service level agreements and the second conditions comprise not meeting service level agreements;
   wherein the first group provides message queuing services by treating all jobs as equal, processing jobs asynchronously and processing jobs as background jobs that defer to foreground, non-message queuing services jobs;
   wherein the second group provides message queuing services by treating all jobs as equal, processing jobs asynchronously and processing jobs in the background to defer to foreground, non-message queuing services, jobs under the first conditions; and
   wherein the second group provides modified message queuing services by scheduling message queue processing based on message type and associated service level parameters.

2. The system of claim 1 wherein the second group further provides modified message queuing services by utilizing shortest-slack-first scheduling under the second conditions.

3. The system of claim 1 wherein the second group further provides modified message queuing services by utilizing selective load shedding under the second conditions.

4. The system of claim 1 wherein the second group further provides modified message queuing services by utilizing dynamic message reordering under the second conditions.

5. The system of claim 1 wherein the second group further provides modified message queuing services by utilizing segmented clustering under the second conditions.

6. The system of claim 1 wherein jobs are classified by a delay threshold (DT), which is a tolerance to job processing delays.

7. The system of claim 1 wherein each message has an associated slack, which corresponds to a deadline for completion of the corresponding message.

8. The system of claim 1 wherein, for messages received by the plurality of servers, dynamic features of the messages that are captured comprise a number of messages for a specific type in a queue, an average per message run time, and an arrival rate of new messages of a specific type.

9. The system of claim 8 wherein the dynamic features of the messages are utilized to determine whether there exists sufficient messaging queue capacity to meet service level guarantees.

10. The system of claim 8 wherein the dynamic features of the messages are utilized to determine whether there exists sufficient messaging queue capacity to meet service level guarantees.

11. A system comprising:
    one or more shared system resources;
    a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise prediction that service level agreements will be met and second conditions comprise prediction that service level agreements will not be met;
    wherein the first group provides message queuing services by treating all jobs as equal, processing jobs asynchronously and processing jobs as background jobs that defer to foreground, non-message queuing services jobs;
    wherein the second group provides message queuing services by treating all jobs as equal, processing jobs asynchronously and processing jobs in the background to defer to foreground, non-message queuing services, jobs under the first conditions; and
    wherein the second group provides modified message queuing services by scheduling message queue processing based on message type and associated service level parameters.

12. The system of claim 11 wherein the second group further provides modified message queuing services by utilizing shortest-slack-first scheduling under the second conditions.

13. The system of claim 11 wherein the second group further provides modified message queuing services by utilizing selective load shedding under the second conditions.

14. The system of claim 11 wherein the second group further provides modified message queuing services by utilizing dynamic message reordering under the second conditions.

15. The system of claim 11 wherein the second group further provides modified message queuing services by utilizing segmented clustering under the second conditions.

16. The system of claim 11 wherein jobs are classified by a delay threshold (DT), which is a tolerance to job processing delays.

17. The system of claim 11 wherein each message has an associated slack, which corresponds to a deadline for completion of the corresponding message.

18. The system of claim 11 wherein, for messages received by the plurality of servers, dynamic features of the messages that are captured comprise a number of messages for a specific type in a queue, an average per message run time, and an arrival rate of new messages of a specific type.

19. A non-transitory computer-readable medium having stored there on instructions that, when executed by one or more processors, cause the one or more processors to:
    receive a stream of messages with a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise meeting service level agreements and the second conditions comprise not meeting service level agreements;

provide message queuing services with the first group by treating all jobs as equal, processing jobs asynchronously and processing jobs as background jobs that defer to foreground, non-message queuing services jobs;

provide message queuing services with the second group by treating all jobs as equal, processing jobs asynchronously and processing jobs in the background to defer to foreground, non-message queuing services, jobs under the first conditions; and provide modified message queuing services with the second group by scheduling message queue processing based on message type and associated service level parameters.

20. The non-transitory computer-readable medium of claim 19 wherein the second group further provides modified message queuing services by utilizing shortest-slack-first scheduling under the second conditions.

21. The non-transitory computer-readable medium of claim 19 wherein the second group further provides modified message queuing services by utilizing selective load shedding under the second conditions.

22. The non-transitory computer-readable medium of claim 19 wherein the second group further provides modified message queuing services by utilizing dynamic message reordering under the second conditions.

23. The non-transitory computer-readable medium of claim 19 wherein the second group further provides modified message queuing services by utilizing segmented clustering under the second conditions.

24. The non-transitory computer-readable medium of claim 19 wherein jobs are classified by a delay threshold (DT), which is a tolerance to job processing delays.

25. The non-transitory computer-readable medium of claim 19 wherein each message has an associated slack, which corresponds to a deadline for completion of the corresponding message.

26. The non-transitory computer-readable medium of claim 19 wherein, for messages received by the plurality of servers, dynamic features of the messages that are captured comprise a number of messages for a specific type in a queue, an average per message run time, and an arrival rate of new messages of a specific type.

27. The non-transitory computer-readable medium of claim 26 wherein the dynamic features of the messages are utilized to determine whether there exists sufficient messaging queue capacity to meet service level guarantees.

28. A non-transitory computer-readable medium having stored there on instructions that, when executed by one or more processors, cause the one or more processors to:

receive a stream of messages with a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise prediction that service level agreements will be met and second conditions comprise prediction that service level agreements will not be met;

provide message queuing services with the first group by treating all jobs as equal, processing jobs asynchronously and processing jobs in the background to defer to foreground, non-message queuing services, jobs;

provide message queuing services with the second group by treating all jobs as equal, processing jobs asynchronously and processing jobs as background jobs that defer to foreground, non-message queuing services jobs; and provide modified message queuing services with the second group by scheduling message queue processing based on message type and associated service level parameters.

29. The non-transitory computer-readable medium of claim 28 wherein the second group further provides modified message queuing services by utilizing shortest-slack-first scheduling under the second conditions.

30. The non-transitory computer-readable medium of claim 28 wherein the second group further provides modified message queuing services by utilizing selective load shedding under the second conditions.

31. The non-transitory computer-readable medium of claim 28 wherein the second group further provides modified message queuing services by utilizing dynamic message reordering under the second conditions.

32. The non-transitory computer-readable medium of claim 28 wherein the second group further provides modified message queuing services by utilizing segmented clustering under the second conditions.

33. The non-transitory computer-readable medium of claim 28 wherein jobs are classified by a delay threshold (DT), which is a tolerance to job processing delays.

34. The non-transitory computer-readable medium of claim 28 wherein each message has an associated slack, which corresponds to a deadline for completion of the corresponding message.

35. The non-transitory computer-readable medium of claim 34 wherein, for messages received by the plurality of servers, dynamic features of the messages that are captured comprise a number of messages for a specific type in a queue, an average per message run time, and an arrival rate of new messages of a specific type.

36. The non-transitory computer-readable medium of claim 28 wherein the dynamic features of the messages are utilized to determine whether there exists sufficient messaging queue capacity to meet service level guarantees.

37. A method comprising:

receiving a stream of messages with a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise meeting service level agreements and the second conditions comprise not meeting service level agreements;

providing message queuing services with the first group by treating all jobs as equal, processing jobs asynchronously and processing jobs as background jobs that defer to foreground, non-message queuing services jobs;

providing message queuing services with the second group by treating all jobs as equal, processing jobs asynchronously and processing jobs in the background to defer to foreground, non-message queuing services, jobs under the first conditions; and providing modified message queuing services with the second group by scheduling message queue processing based on message type and associated service level parameters.

38. The method of claim 37 wherein the second group further provides modified message queuing services by utilizing shortest-slack-first scheduling under the second conditions.

39. The method of claim 37 wherein the second group further provides modified message queuing services by utilizing selective load shedding under the second conditions.

40. The method of claim 37 wherein the second group further provides modified message queuing services by utilizing dynamic message reordering under the second conditions.

41. The method of claim 37 wherein the second group further provides modified message queuing services by utilizing segmented clustering under the second conditions.

42. The method of claim 37 wherein jobs are classified by a delay threshold (DT), which is a tolerance to job processing delays.

43. The method of claim 37 wherein each message has an associated slack, which corresponds to a deadline for completion of the corresponding message.

44. The method of claim 37 wherein, for messages received by the plurality of servers, dynamic features of the messages that are captured comprise a number of messages for a specific type in a queue, an average per message run time, and an arrival rate of new messages of a specific type.

45. The method of claim 44 wherein the dynamic features of the messages are utilized to determine whether there exists sufficient messaging queue capacity to meet service level guarantees.

46. A method comprising:
receiving a stream of messages with a plurality of servers coupled to provide access to the one or more shared system resources, the plurality of servers organized as at least two groups with a first group providing message queuing services and a second group providing message queuing services under first conditions and modified message queuing services under second conditions, wherein the first conditions comprise prediction that service level agreements will be met and second conditions comprise prediction that service level agreements will not be met;
providing message queuing services with the first group by treating all jobs as equal, processing jobs asynchronously and processing jobs as background jobs that defer to foreground, non-message queuing services jobs;
providing message queuing services with the second group by treating all jobs as equal, processing jobs asynchronously and processing jobs in the background to defer to foreground, non-message queuing services, jobs under the first conditions; and
providing modified message queuing services with the second group by scheduling message queue processing based on message type and associated service level parameters.

47. The method of claim 46 wherein the second group further provides modified message queuing services by utilizing shortest-slack-first scheduling under the second conditions.

48. The method of claim 46 wherein the second group further provides modified message queuing services by utilizing selective load shedding under the second conditions.

49. The method of claim 46 wherein the second group further provides modified message queuing services by utilizing dynamic message reordering under the second conditions.

50. The method of claim 46 wherein the second group further provides modified message queuing services by utilizing segmented clustering under the second conditions.

51. The method of claim 46 wherein jobs are classified by a delay threshold (DT), which is a tolerance to job processing delays.

52. The method of claim 46 wherein each message has an associated slack, which corresponds to a deadline for completion of the corresponding message.

53. The method of claim 46 wherein, for messages received by the plurality of servers, dynamic features of the messages that are captured comprise a number of messages for a specific type in a queue, an average per message run time, and an arrival rate of new messages of a specific type.

* * * * *